United States Patent
Lee et al.

(10) Patent No.: US 8,728,655 B2
(45) Date of Patent: May 20, 2014

(54) SECONDARY BATTERY

(75) Inventors: Chiyoung Lee, Yongin-si (KR);
 Seokyoon Yoo, Yongin-si (KR); Yoontai Kwak, Yongin-si (KR); Dongwook Kim, Yongin-si (KR); Jongseok Moon, Yongin-si (KR); Tatsuya Hashimoto, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 444 days.

(21) Appl. No.: 12/926,219

(22) Filed: Nov. 3, 2010

(65) Prior Publication Data

US 2011/0183191 A1  Jul. 28, 2011

(30) Foreign Application Priority Data

Jan. 27, 2010 (KR) .................. 10-2010-0007461

(51) Int. Cl.
 *H01M 2/04* (2006.01)
(52) U.S. Cl.
 USPC ................ 429/179; 429/143; 429/146
(58) Field of Classification Search
 USPC ................................ 429/179, 143, 146
 See application file for complete search history.

(56) References Cited

U.S. PATENT DOCUMENTS

| 2006/0063068 A1 | 3/2006 | Cheon et al. | |
|---|---|---|---|
| 2009/0087735 A1* | 4/2009 | Yoon et al. | 429/185 |
| 2010/0112434 A1* | 5/2010 | Akou et al. | 429/174 |

FOREIGN PATENT DOCUMENTS

| JP | 2005-142026 A | 6/2005 |
|---|---|---|
| KR | 10 2005-0095950 A | 10/2005 |
| KR | 10 2006-0022357 A | 3/2006 |
| KR | 10 2006-0026602 A | 3/2006 |

OTHER PUBLICATIONS

Korean Notice of Allowance in KR 10-2010-0007461, dated Oct. 19, 2011 (Lee, et al.).

* cited by examiner

*Primary Examiner* — Ula C Ruddock
*Assistant Examiner* — Frank Chernow
(74) *Attorney, Agent, or Firm* — Lee & Morse, P.C.

(57) ABSTRACT

A secondary battery including a case providing an inner space; at least one electrode assembly, the at least one electrode assembly including a stacked and wound positive electrode plate, negative electrode plate, and separator between the positive electrode plate and the negative electrode plate, and being disposed within the case and including a non-coating portion on an end thereof; a collector plate including alternately arranged crests and troughs, the non-coating portion of the electrode assembly being disposed on the crests and the crests being welded to the non-coating portion; a collector terminal coupled to one end of the collector plate, the collector terminal protruding upwardly from the case; and a cap plate on an upper portion of the case, the cap plate sealing the case.

12 Claims, 4 Drawing Sheets

SECONDARY BATTERY

BACKGROUND

1. Field

Embodiments relate to a secondary battery.

2. Description of the Related Art

Generally, secondary batteries represent chargeable and dischargeable batteries, unlike primary batteries which may not be recharged. Small-sized secondary batteries may be widely used in fields of high-tech electronic equipment, e.g., a cellular phone, a notebook computer, and a camcorder. Large-sized secondary batteries may be used as power sources for, e.g., operating motors of electric vehicles or hybrid vehicles. Such a secondary battery may include an electrode assembly within a case and electrode terminals connected through a collector plate welded to the electrical assembly.

SUMMARY

Embodiments are directed to a secondary battery which represents advances over the related art.

It is a feature of an embodiment to provide a secondary battery which has improved efficiency and reliability when a non-coating portion of an electrode assembly and a collector plate are welded to each other.

It is another feature of an embodiment to provide a secondary battery which allow for easy detection of weld quality.

At least one of the above and other features and advantages may be realized by providing a secondary battery including a case providing an inner space; at least one electrode assembly, the at least one electrode assembly including a stacked and wound positive electrode plate, negative electrode plate, and separator between the positive electrode plate and the negative electrode plate, and being disposed within the case and including a non-coating portion on an end thereof; a collector plate including alternately arranged crests and troughs, the non-coating portion of the electrode assembly being disposed on the crests and the crests being welded to the non-coating portion; a collector terminal coupled to one end of the collector plate, the collector terminal protruding upwardly from the case; and a cap plate on an upper portion of the case, the cap plate sealing the case.

The non-coating portion may be concentrated adjacent to a lower portion of each of the crests and welded thereto.

The collector plate may include a through-hole therethrough in a central portion of the crests, the non-coating portion being exposed through the through-hole, or a welding groove, the welding groove reducing a thickness of the crest.

The non-coating portion may be concentrated adjacent to the through-hole or the welding groove of the collector plate and welded.

The non-coating portion may be congregated adjacent to the through-hole or the welding groove along a lower portion of each of the troughs.

The through-hole of the collector plate may be defined along a curved shape of the crest.

The collector plate may have a welding groove defined therein and the collector plate and welding groove may have a width less than that of the non-coating portion.

The collector plate may be coupled to the non-coating portion by a butt welding process.

The collector plate may have a pair of ends and the collector terminal may be welded and coupled to both ends of the collector plate in a width direction of the collector plate.

The collector plate may be compressed in a width direction of the non-coating portion and welded to the non-coating portion. The collector plate may be welded to the non-coating portion in the width direction of the non-coating portion without a gap between the collector plate and the non-coating portion.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
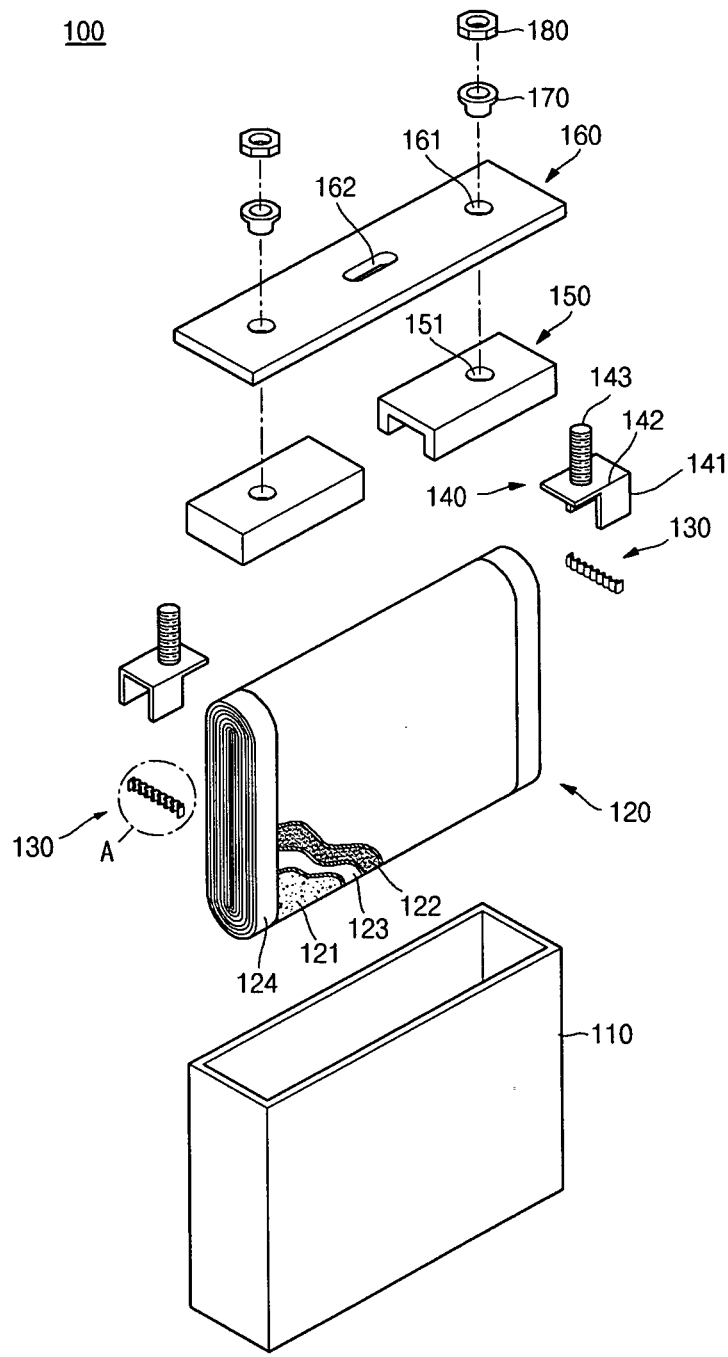
FIG. 1 illustrates an exploded perspective view of a secondary battery according to an embodiment.

Korean Patent Application No. 10-2010-0007461 filed on Jan. 27, 2010, in the Korean Intellectual Property Office, and entitled: "Secondary Battery" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Hereinafter, a secondary battery according to an embodiment will be described.

Figure 2:
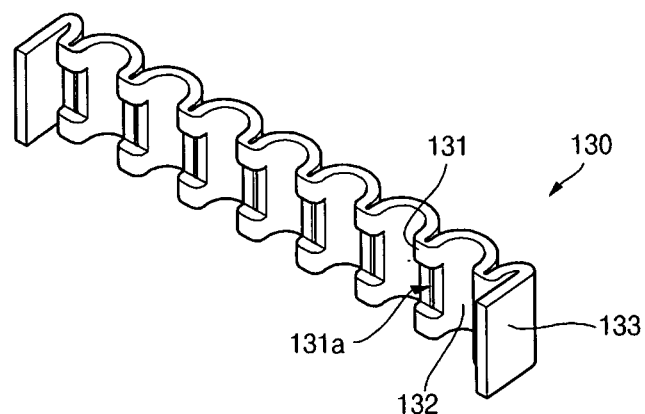
FIG. 2 illustrates an enlarged view of a portion A of FIG. 1.
Figure 3:
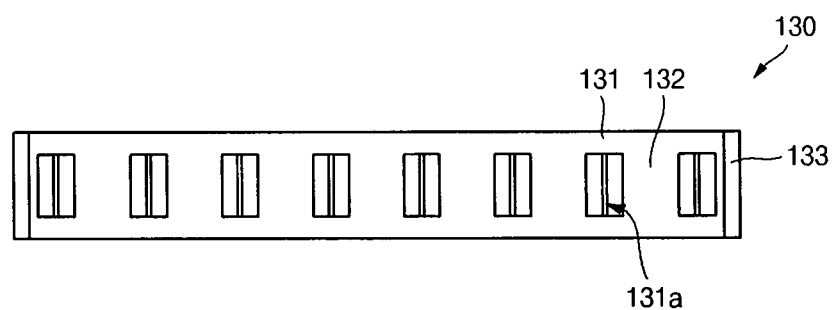
FIG. 3 illustrates a plan view of a collector plate of FIG. 2.
Figure 4:
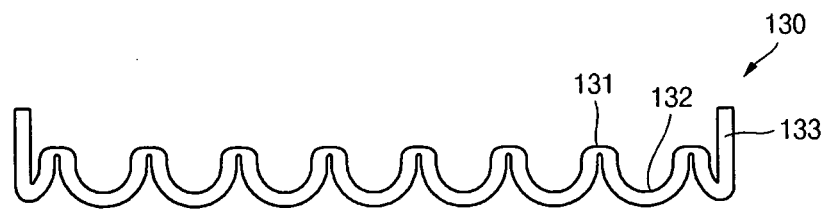
FIG. 4 illustrates a side view of the collector plate of FIG. 2.

FIG. 1 illustrates an exploded perspective view of a secondary battery according to an embodiment. FIG. 2 illustrates an enlarged view of a collector plate in portion A of FIG. 1. FIG. 3 illustrates a plan view of the collector plate of FIG. 2. FIG. 4 illustrates a side view of the collector plate of FIG. 2.

Referring to FIGS. 1 through 4, a secondary battery 100 according to an embodiment may include a case 110, an electrode assembly 120 disposed within the case 110, a collector plate 130 electrically connected to the electrode assembly 120, a collector terminal 140 electrically connected to the collector plate 130, a first dielectric 150 through which the collector terminal 140 passes, a cap plate 160 coupled to an upper portion of the first dielectric 150, and a second dielectric 170 passing through the cap plate 160 and coupled to the collector terminal 140. A nut 180 may be further coupled to the collector terminal 140.

The case 110 may have, e.g., a hexahedral shape or other shapes. Also, a space may be defined inside the case 110. The case 110 may be formed of a conductive metal, e.g., aluminum, an aluminum alloy, or a stick on which nickel is coated.

The electrode assembly 120 may be disposed within the case 110. The electrode assembly 120 may include a separator 123 disposed between a positive electrode plate 121 and a negative electrode plate 122. The electrode assembly 120 may have a jelly-roll structure in which the positive electrode plate 121, the negative electrode plate 122, and the separator 123 are wound in a vortex shape in a state where they are stacked on each other. For convenience of description, although one electrode assembly 120 is illustrated within the case 110, a plurality of electrode assemblies 120 may be provided.

The electrode assembly 120 may include non-coating portions 124 on both ends thereof. The non-coating portions 124 may be provided as a pair, i.e., may include a portion of the positive electrode plate 121 at one end of the electrode assembly 120 and a portion of the negative electrode plate 122 at another end of the electrode assembly 120.

The electrode assembly 120 may be coupled to the collector plate 130. The non-coating portion 124 may be coupled to a crest of the collector plate 130 along a curved shape of the collector plate 130. Also, as will be described below, the non-coating portion 124 may be exposed through a through-hole 131a in the crest 131 of the collector plate 130. The non-coating portion 130 may be coupled to the collector plate 130 through, e.g., a butt welding process, in a state where the non-coating portion 130 is exposed.

Thus, since the non-coating portion 124 may only need to have a length corresponding to a thickness or depth of the collector plate 130, the non-coating portion 124 may have a relatively short length, i.e., may occupy a relatively small portion of the electrode assembly 120. As a result, capacity of the secondary battery 100 according to the present embodiment may be improved.

Also, since the non-coating portion 124 may be coupled through the butt welding process in the state where it is exposed to the outside of the collector plate 130, welding efficiency may be improved and welding quality may be easily detected from the outside, i.e., the weld may be visible through the through-hole 131a.

The collector plate 130 may be electrically coupled to the non-coating portion 124 of the electrode assembly 120. The collector plate 130 may be coupled to at least one of the non-coating portion 124 of the positive electrode plate 121 and/or the negative electrode plate 122. Hereinafter, a structure in which the collector plate 130 is coupled to the non-coating portion 124 of the positive electrode plate 122 will be described as an example.

The collector plate 130 may include crests 131 and troughs 132 alternately disposed along a width of the non-coating portion 124. The crests 131 may protrude from where the collector plate 130 is coupled to the non-coating portion 124 toward an outside of, i.e., away from, the non-coating portion 124. The troughs 132 may protrude toward, e.g., an inside of the non-coating portion 124. The crests 131 and troughs 132 may be alternately sequentially arranged. As a result, the collector plate may have an approximately wave shape.

Each of the crests 131 may have the through-hole 131a in a certain region thereof. The through-hole 131a may be defined in an approximately central portion of the crest 131 and the non-coating portion 124 may be exposed through the through-hole 131a. Thus, the butt welding process may be performed in the state where the non-coating portion 124 is exposed.

A plate 133 may be disposed on each end of the collector plate 130 with respect to a width of the collector plate 130. The plate 133 may provide a larger welding area to easily weld the collector plate 130 to the collector terminal 140. Thus, after the collector plate 130 is coupled to the non-coating portion 124, the collector terminal 140 may be easily welded and coupled to the plate 133 of the collector plate 130.

The collector terminal 140 may be provided as a pair. Also, the collector terminal 140 may be electrically connected to each of the collector plates 130. The collector terminal 140 may be coupled to the plate 133 of the collector plate 130 to provide a passage through which a charge/discharge voltage of the electrode assembly 120 may be inputted or outputted. The collector terminal 140 may include a first plate 141 coupled to the plate 133 of the collector plate 130, a second plate 142 disposed perpendicular to the first plate 141 and parallel to a bottom surface of the case 110, and an electrode terminal 143 protruding from the second plate 142. A male screw thread may be disposed on an outer circumference of the electrode terminal 143, and may thus be coupled to the nut 180.

The first dielectric 150 may be disposed on an upper portion of the collector terminal 140. The first dielectric 150 may be disposed between the second plate 142 of the collector terminal 140 and the cap plate 160. The first dielectric 150 may electrically separate the collector terminal 140 from the cap plate 160. Also, a terminal hole 151 may be defined in the first dielectric 150. The electrode terminal 143 of the collector terminal 140 may pass through the terminal hole 151 to upwardly protrude therefrom.

The cap plate 160 may be disposed at an upper portion of the case 110 to seal the case 110. The cap plate 160 may be coupled to the case 110 to prevent an electrolyte within the case 110 from leaking. A terminal hole 161 may be defined in the cap plate 160. Thus, the electrode terminal 143 of the collector terminal 140 may pass through the terminal hole 161 to upwardly protrude therefrom. Also, a vent may be defined in an approximately central portion of the cap plate 160. Thus, when gas is generated within the case 110 during, e.g., overcharging, the vent may open to exhaust the gas prior to damaging other parts of the battery.

The second dielectric 170 may be disposed between the cap plate 160 and the electrode terminal 143 of the collector terminal 140. The second dielectric 170 may electrically separate the cap plate 150 from the electrode terminal 143 of the collector terminal 140. Also, since the second dielectric 170 may also be disposed on an upper portion of the cap plate 160, the nut 180 may be electrically separated from the cap plate 160 when it is coupled to the electrode terminal 143.

The nut 180 may be disposed on an upper portion of the second dielectric 170. A female screw thread may be disposed inside the nut 180 and coupled to the electrode terminal 143 of the collector terminal 140. The nut 180 may fix the electrode terminal 143 of the collector terminal 140 to thereby fix positions of the collector terminal 140 and the electrode assembly 120.

Hereinafter, a structure in which the collector plate 130 and the non-coating portion 124 are coupled to each other in the secondary battery 100 according to an embodiment will be described in detail.

Figure 5:
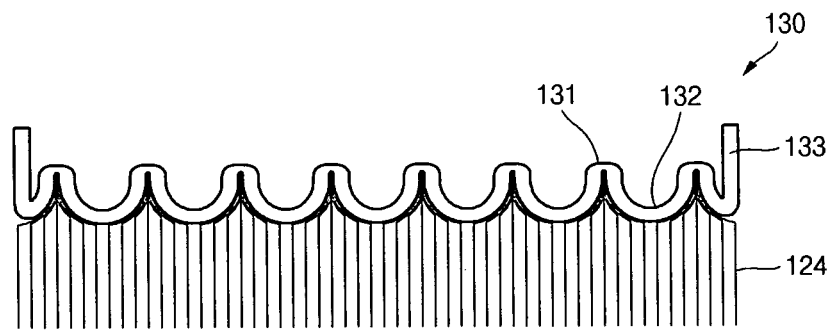
FIG. 5 illustrates a side view of a state in which a non-coating portion is coupled to the collector plate of FIG. 2 in a secondary battery according to an embodiment.
Figure 6:
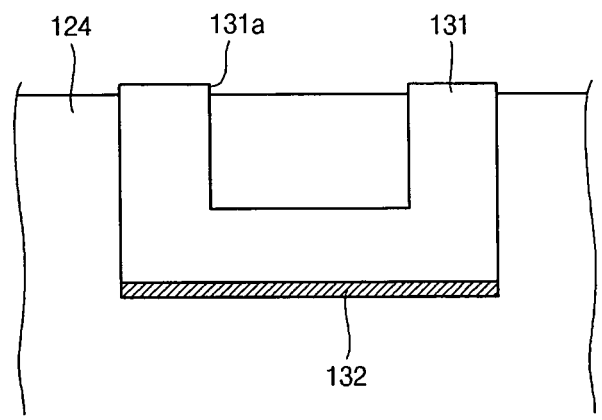
FIG. 6 illustrates a sectional view of the current collector of FIG. 5.

FIG. 5 illustrates a side view of a state in which a non-coating portion is coupled to the collector plate of FIG. 2. FIG. 6 illustrates a sectional view of the collector plate of FIG. 5.

Referring to FIGS. 5 and 6, the non-coating portion 124 may be coupled to the collector plate 130 at a lower side thereof. In order to couple the non-coating portion 124 to the collector plate 130, the non-coating portion 124 may be moved along the trough 132 and then disposed at a lower portion of or in the crest 131. Since the lower portion of the crest 131 may have a width greater than that of the non-coating portion 124, the non-coating portion 124 may be concentrated adjacent to the lower portion of or within the crest 131. Thus, the non-coating portion 124 may be densely disposed adjacent to or within the crest 131 and may be firmly coupled by an elastic force of the collector plate 130.

When the through-hole 131a is in the crest 131 of the collector plate 130, since the non-coating portion 124 may be exposed to the outside of the collector plate 130 through the through-hole 131a, the welding process may be easily performed. In addition, weld quality may be observed through the through-hole 131a.

Figure 7:
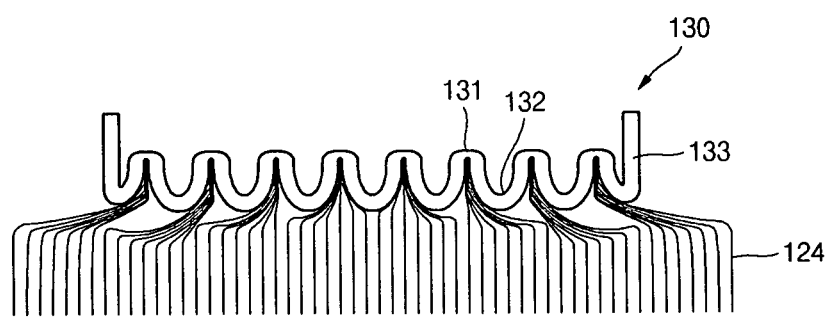
FIG. 7 illustrates a side view of a state in which the collector plate of FIG. 2 and elements of a non-coating portion are compressed and coupled to each other according to an embodiment.

FIG. 7 illustrates a side view of a state in which the collector plate of FIG. 2 and a non-coating portion are compressed and coupled to each other according to an embodiment.

Referring to FIG. 7, pressure may be applied to ends of the collector plate 130 to reduce a width thereof. As a result, a gap between the collector plate 130 and the non-coating portion 124 may be reduced. Thus, when the collector plate 130 and the non-coating portion 124 are butt-welded, the welding process may be sequentially performed to thereby improve welding efficiency. Also, when the collector plate 130 is welded to the non-coating portion 124, the welding process may be performed on a side surface of the electrode assembly 120, i.e., a side surface of the non-coating portion 124. Thus, a welding beam used during the welding process may be prevented from reaching and possibly damaging the electrode assembly 120.

Also, since the welding process may be performed on the side surface of the non-coating portion 124, a size of the non-coating portion 124 may be reduced. Thus, coating portions (not illustrated) of the electrode assembly 120 may have an increased size and the capacity of the secondary battery 100 according to the present embodiment may be improved.

Also, since the butt welding process may be performed in the state where the non-coating portion 124 is exposed through the through-hole 131a, the welding quality may be easily detected or observed from the outside and the welding reliability may be improved.

Hereinafter, a secondary battery according to another embodiment will be described.

Figure 8:
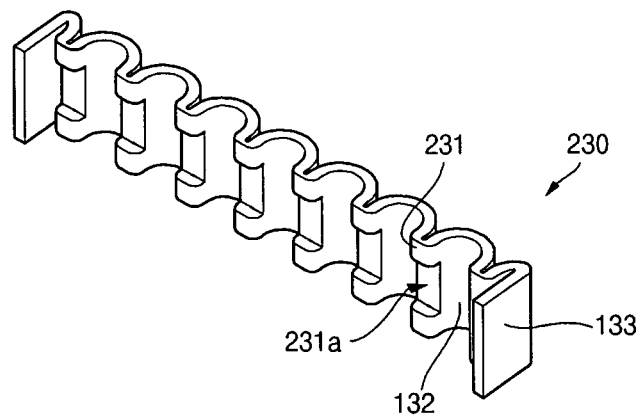
FIG. 8 illustrates a perspective view of a collector plate in a secondary battery according to another embodiment.
Figure 9:
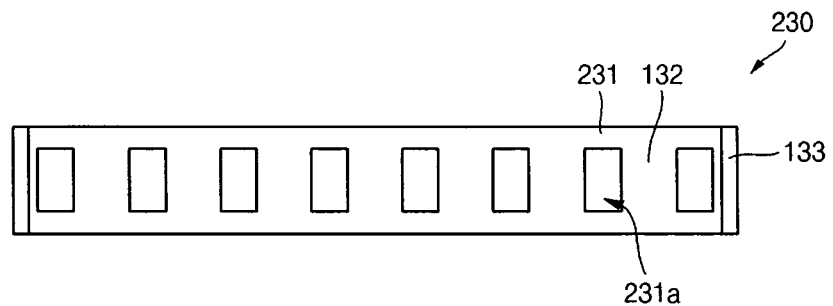
FIG. 9 illustrates a plan view of the collector plate of FIG. 8.

FIG. 8 illustrates a perspective view of a collector plate used in a secondary battery according to another embodiment. FIG. 9 illustrates a plan view of the collector plate of FIG. 8. Parts having the same composition and effect as those of the previously described embodiment will be designated by like reference numeral, and thus different points will be mainly described.

Referring to FIGS. 8 and 9, a secondary battery according to the present embodiment may include a collector plate 230, and other components except the collector plate 230 may be the same as those of the previously described embodiment.

The collector plate 230 may include crests 231 and troughs 232 alternately disposed along a width of the non-coating portion 124 of the electrode assembly 120. The crests 231 and the troughs 232 may be sequentially and alternately arranged.

The crests 231 may protrude from where the collector plate 230 is coupled to the non-coating portion 224 toward an outside of, i.e., away from, the non-coating portion 224. Unlike the previously described embodiments, each of the crests 231 may not include a hole. The non-coating portion 224 may be concentrated adjacent to a lower portion of an approximately central portion of the crest 231, i.e., within the crest 231. In this state, when a welding process is performed, the crest 231 and the non-coating portion 124 may be coupled to each other. In an implementation, a butt welding process may be performed as the welding process. Thus, in the secondary battery according to the present embodiment, when the collector plate 230 is manufactured, since a separate through-hole may not be required, productivity may be improved and manufacturing costs may be reduced when compared to those of the previously described embodiment.

A welding groove 231a may be additionally defined in the central portion of the crest 231. The welding groove 231a may be defined in the approximately central portion of the crest 231. The welding groove 231a may reduce a thickness of the crest 231. Thus, when the welding process is performed in a state where the non-coating portion 124 is concentrated adjacent to, e.g., a lower portion of, the welding groove 231a, the welding efficiency may be improved. The collector plate 240 and the welding groove 231a may have a width less than that of the non-coating portion 124.

In the secondary battery according to the embodiments, the collector plate in which the crests and the troughs are repeatedly and alternately are disposed may facilitate position of the non-coating portion to correspond to the crests of the collector plate without generating a gap therebetween. Thus, when the collector plate and the non-coating portion are welded to each other, the welding process may be sequentially performed to thereby improve welding efficiency.

Also, in the secondary battery according to the embodiments, the through-hole may be defined in the crest of the collector plate. Thus, since the welding process may be performed in the state where the non-coating portion is exposed through the through-hole, the welding quality may be easily detected or observed from the outside and the welding reliability may be improved.

Also, in the secondary battery according to the embodiments, the welding groove may be defined in the crest of the collector plate. Thus, since the welding process may be performed in the state where the non-coating portion is disposed at the lower portion of or adjacent to the welding groove, the welding efficiency may be improved.

Also, in the secondary battery according to the embodiments, since the welding process may be performed on the side surface of the non-coating portion that is the side surface of the electrode assembly, it may prevent the welding beam from reaching and possibly damaging the electrode assembly to improve the welding reliability.

Also, in the secondary battery according to the embodiments, a size of the non-coating portion in the electrode assembly may be reduced to improve the capacity of the secondary battery.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
   a case providing an inner space;
   at least one electrode assembly, the at least one electrode assembly:
   including a stacked and wound positive electrode plate, negative electrode plate, and separator between the positive electrode plate and the negative electrode plate, and
   being disposed within the case and including a non-coating portion on an end thereof;
   a collector plate including alternately arranged crests and troughs, the non-coating portion of the electrode assembly directly contacting the crests at a lower portion of an inflection point of the crests, and the crests being welded to the non-coating portion, wherein the troughs extend into the non-coating portion of the electrode assembly and electrically connect adjacent crests;
   a collector terminal coupled to one end of the collector plate, the collector terminal protruding upwardly from the case; and
   a cap plate on an upper portion of the case, the cap plate sealing the case.

2. The secondary battery as claimed in claim 1, wherein the non-coating portion is concentrated adjacent to a lower portion of each of the crests and welded thereto.

3. The secondary battery as claimed in claim 1, wherein the collector plate includes:
   a through-hole therethrough in a central portion of the crests, the non-coating portion being exposed through the through-hole, or
   a welding groove, the welding groove reducing a thickness of the crest.

4. The secondary battery as claimed in claim 3, wherein the non-coating portion is concentrated adjacent to the through-hole or the welding groove of the collector plate and welded.

5. The secondary battery as claimed in claim 4, wherein the non-coating portion is congregated adjacent to the through-hole or the welding groove along a lower portion of each of the troughs.

6. The secondary battery as claimed in claim 3, wherein the through-hole of the collector plate is defined along a curved shape of the crest.

7. The secondary battery as claimed in claim 1, wherein the collector plate has a welding groove defined therein and the collector plate and welding groove have a width less than that of the non-coating portion.

8. The secondary battery as claimed in claim 1, wherein the collector plate is coupled to the non-coating portion by a butt welding process.

9. The secondary battery as claimed in claim 1, wherein the collector plate has a pair of ends and the collector terminal is welded and coupled to both ends of the collector plate in a width direction of the collector plate.

10. The secondary battery as claimed in claim 1, wherein the collector plate is compressed in a width direction of the non-coating portion and welded to the non-coating portion.

11. The secondary battery as claimed in claim 10, wherein the collector plate is welded to the non-coating portion in the width direction of the non-coating portion without a gap between the collector plate and the non-coating portion.

12. The secondary battery as claimed in claim 1, wherein the collector plate has a wave shape in cross section, the wave shape being formed by the alternately arranged crests and troughs.

* * * * *